US009484599B2

(12) United States Patent
Mizawa et al.

(10) Patent No.: US 9,484,599 B2
(45) Date of Patent: Nov. 1, 2016

(54) NON-AQUEOUS ELECTROLYTE SECONDARY BATTERY

(75) Inventors: Atsushi Mizawa, Hyogo (JP); Yoshiyuki Muraoka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 210 days.

(21) Appl. No.: 14/241,033

(22) PCT Filed: Aug. 30, 2012

(86) PCT No.: PCT/JP2012/005486
§ 371 (c)(1),
(2), (4) Date: Feb. 25, 2014

(87) PCT Pub. No.: WO2013/031226
PCT Pub. Date: Mar. 7, 2013

(65) Prior Publication Data
US 2014/0178732 A1 Jun. 26, 2014

(30) Foreign Application Priority Data

Aug. 31, 2011 (JP) .................................. 2011-188417

(51) Int. Cl.
*H01M 10/0587* (2010.01)
*H01M 10/0567* (2010.01)
*H01M 4/13* (2010.01)
*H01M 2/16* (2006.01)
*H01M 10/0525* (2010.01)
*H01M 10/0569* (2010.01)
*H01M 4/02* (2006.01)
*H01M 10/42* (2006.01)
*H01M 4/131* (2010.01)
(Continued)

(52) U.S. Cl.
CPC ....... *H01M 10/0587* (2013.01); *H01M 2/1673* (2013.01); *H01M 4/13* (2013.01);
(Continued)

(58) Field of Classification Search
CPC .................. H01M 10/0587; H01M 2004/021; H01M 2010/4292; H01M 10/0567
USPC .......................................................... 429/94
See application file for complete search history.

(56) References Cited

U.S. PATENT DOCUMENTS

2002/0039677 A1* 4/2002 Iwamoto et al. ............. 429/122
2003/0129500 A1* 7/2003 Gan et al. ..................... 429/332
(Continued)

FOREIGN PATENT DOCUMENTS

EP  1978587 A1  10/2008
EP  2320512 A1   5/2011
(Continued)

OTHER PUBLICATIONS

Watari et al. JP 2001-196094. Jul. 19, 2001. English machine translation by JPO.*
(Continued)

*Primary Examiner* — James Lee
(74) *Attorney, Agent, or Firm* — McDermott Will & Emery LLP

(57) ABSTRACT

Provided is a non-aqueous electrolyte secondary battery having a high capacity and an improved cycle life. The battery includes an electrode group and a non-aqueous electrolyte, and has a volume energy density of 650 Wh/L or more. The electrode group includes wound positive and negative electrodes with a separator interposed therebetween. The positive and negative electrodes each include a current collector and a material mixture layer adhering thereto. The positive and negative electrode material mixture layers each have a porosity $P_p$ of 22% or less and porosity $P_n$ of 25% or less. The ratio $V_E/V_T$ of a volume $V_E$ of the electrolyte to a total $V_T$ of the pore volumes of the positive and negative electrode material mixture layers, and the separator is 1 to 1.5. The difference between contact angles $CA_p$ and $CA_n$ of the positive and negative electrodes with respect to the non-aqueous electrolyte is 23° or less.

13 Claims, 3 Drawing Sheets

(51) Int. Cl.
*H01M 4/133* (2010.01)
*H01M 4/139* (2010.01)

(52) U.S. Cl.
CPC ..... H01M10/0525 (2013.01); H01M 10/0569 (2013.01); *H01M 4/131* (2013.01); *H01M 4/133* (2013.01); *H01M 4/139* (2013.01); *H01M 2004/021* (2013.01); *H01M 2010/4292* (2013.01); *H01M 2300/004* (2013.01); *Y02E 60/122* (2013.01); *Y02T 10/7011* (2013.01)

(56) References Cited

U.S. PATENT DOCUMENTS

2003/0175597 A1\* 9/2003 Otsuki et al. ............... 429/326
2008/0241701 A1 10/2008 Okumura et al.
2009/0263707 A1\* 10/2009 Buckley et al. ............ 429/94
2010/0297509 A1 11/2010 Okumura et al.

FOREIGN PATENT DOCUMENTS

| JP | H10-261395 A | 9/1998 |
| JP | 2001-196094 A | 7/2001 |
| JP | 2002-270225 A | 9/2002 |
| JP | 2003-331825 A | 11/2003 |
| JP | 2005-158623 A | 6/2005 |
| JP | 2005-340074 A | 12/2005 |
| JP | 2009-123671 A | 6/2009 |
| JP | 2010-027368 A | 2/2010 |

OTHER PUBLICATIONS

International Search Report issued in International Application No. PCT/JP2012/005486 with Date of mailing Nov. 27, 2012, with English Translation.

\* cited by examiner

NON-AQUEOUS ELECTROLYTE SECONDARY BATTERY

RELATED APPLICATIONS

This application is the U.S. National Phase under 35 U.S.C. §371 of International Application No. PCT/JP2012/005486, filed on Aug. 30, 2012, which in turn claims the benefit of Japanese Application No. 2011-188417, filed on Aug. 31, 2011, the disclosures of which Applications are incorporated by reference herein.

TECHNICAL FIELD

The present invention relates to a non-aqueous electrolyte secondary battery, and specifically relates to an improvement of material mixture layers of positive and negative electrodes thereof.

BACKGROUND ART

Non-aqueous electrolyte secondary batteries such as lithium ion secondary batteries provide high voltage and have high energy density and capacity, and they are expected as promising power sources of various devices. Particularly for those used as driving power sources of mobile devices, hybrid electric vehicles, electric vehicles, and the like, a higher capacity is required to further improve the operating time and the driving distance.

Under these circumstances, examinations have been made to increase the energy density of non-aqueous electrolyte secondary batteries.

For example, Patent Literature 1 discloses that, in a non-aqueous electrolyte secondary battery having a volume energy density of about 300 Wh/L, the volume of liquid non-aqueous electrolyte contained therein be controlled to 120 to 140% of the total pore volume of the positive electrode, negative electrode, and separator, in view of the cycle characteristics and safety. Here, the volume energy density is an energy density of a battery per volume specified by the size of a case of the battery.

Patent Literature 2 combines ethylene carbonate (EC) or propylene carbonate (PC) with ethyl methyl carbonate (EMC) and dimethyl carbonate (DMC), as a non-aqueous solvent to be included in a non-aqueous electrolyte for a lithium ion secondary battery. Patent Literature 2 discloses that by combining solvents as above, the viscosity of the non-aqueous electrolyte is reduced to improve the permeability thereof into the separator, and thus a sufficient discharge capacity can be obtained.

CITATION LIST

Patent Literature

[PTL 1] Japanese Laid-Open Patent Publication No. 2001-196094
[PTL 2] Japanese Laid-Open Patent Publication No. Hei 10-261395

SUMMARY OF INVENTION

Technical Problem

In Patent Literature 1, the volume energy density is about 300 Wh/L. For batteries used as driving power sources and similar applications, however, a further higher capacity, for example, a volume energy density of 650 Wh/L or more, is required. To realize batteries with such a high capacity, it is effective to increase the amount of active material that contributes to charge and discharge. One possible way to increase the active material amount is to use an electrode group formed by winding a positive electrode and a negative electrode, with a separator interposed therebetween, and to improve the density of active material in the material mixture layers of the positive and negative electrodes. However, increasing the density of active material in the material mixture layers of the positive and negative electrodes reduces the porosities of the material mixture layers, causing the non-aqueous electrolyte to be less likely to permeate into the material mixture layers. When the permeability of the non-aqueous electrolyte is low, excellent discharge characteristics are difficult to obtain.

On the other hand, reducing the viscosity of non-aqueous electrolyte as in Patent Literature 2 would improve not only the permeability thereof into the separator, but also the permeability thereof into the material mixture layers to some extent.

However, in a non-aqueous electrolyte secondary battery having a volume energy density of 650 Wh/L or more, due to the necessity of packing a large amount of active material, the residual space within the battery (i.e., the space volume obtained by subtracting the solid volume of the electrode group from the inner space volume of the empty battery case) is decreased. This reduces the amount of non-aqueous electrolyte itself that can be contained in the battery.

A reduction in the amount of non-aqueous electrolyte that can be contained in the battery means a reduction in the amount of non-aqueous electrolyte that can be involved in the battery reaction. When the amount of non-aqueous electrolyte is small, the difference in permeability of non-aqueous electrolyte between at the positive electrode and at the negative electrode tends to increase. This is considered to cause the non-aqueous electrolyte to be unevenly distributed between the electrodes, i.e., a larger amount of non-aqueous electrolyte is distributed in one of the electrodes at which the permeability of non-aqueous electrolyte is higher than the other, and the amount of non-aqueous electrolyte becomes insufficient in the other electrode. Therefore, reducing the viscosity of non-aqueous electrolyte alone cannot suppress the uneven distribution of non-aqueous electrolyte. This results in a failure of extracting the capacity to the full, failing to suppress a reduction in capacity retention rate after repetitive charge and discharge.

Solution to Problem

The present invention intends to provide a non-aqueous electrolyte secondary battery having a high capacity, and despite this, having an improved cycle life.

One aspect of the present invention relates to a non-aqueous electrolyte secondary battery including: an electrode group including a positive electrode, a negative electrode, and a separator interposed between the positive electrode and the negative electrode, the positive electrode, the negative electrode, and the separator being wound together; and a non-aqueous electrolyte. The non-aqueous electrolyte secondary battery has a volume energy density of 650 Wh/L or more. The positive electrode includes a positive electrode current collector, and a positive electrode material mixture layer adhering to a surface of the positive electrode current collector. The negative electrode includes a negative electrode current collector, and a negative electrode material mixture layer adhering to a surface of the negative electrode current collector. The positive electrode material mixture layer has a porosity $P_p$ of 22% or less, and the negative electrode material mixture layer has a porosity $P_n$ of 25% or less. The ratio $V_E/V_T$ of a volume $V_E$ of the non-aqueous electrolyte to a total $V_T$ of a pore volume of the positive electrode material mixture layer, a pore volume of the negative electrode material mixture layer, and a pore volume of the separator is 1 or more and 1.5 or less. The difference between a contact angle $CA_p$ of the positive electrode and a contact angle $CA_n$ of the negative electrode with respect to the non-aqueous electrolyte is 23° or less.

Advantageous Effects of Invention

According to the present invention, it is possible to provide a non-aqueous electrolyte secondary battery in which, even in the case where the amount of non-aqueous electrolyte that can be contained in the battery is reduced as a result of having achieved a higher capacity, uneven distribution of non-aqueous electrolyte is unlikely to occur, and the cycle life is improved.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF DRAWINGS

FIG. 2b A schematic cross-sectional view of the positive electrode of FIG. 2a

FIG. 2c A schematic rear view of the positive electrode of FIG. 2a

FIG. 3b A schematic cross-sectional view of the negative electrode of FIG. 3a

FIG. 3c A schematic rear view of the negative electrode of FIG. 3a

DESCRIPTION OF EMBODIMENT

Figure 1:
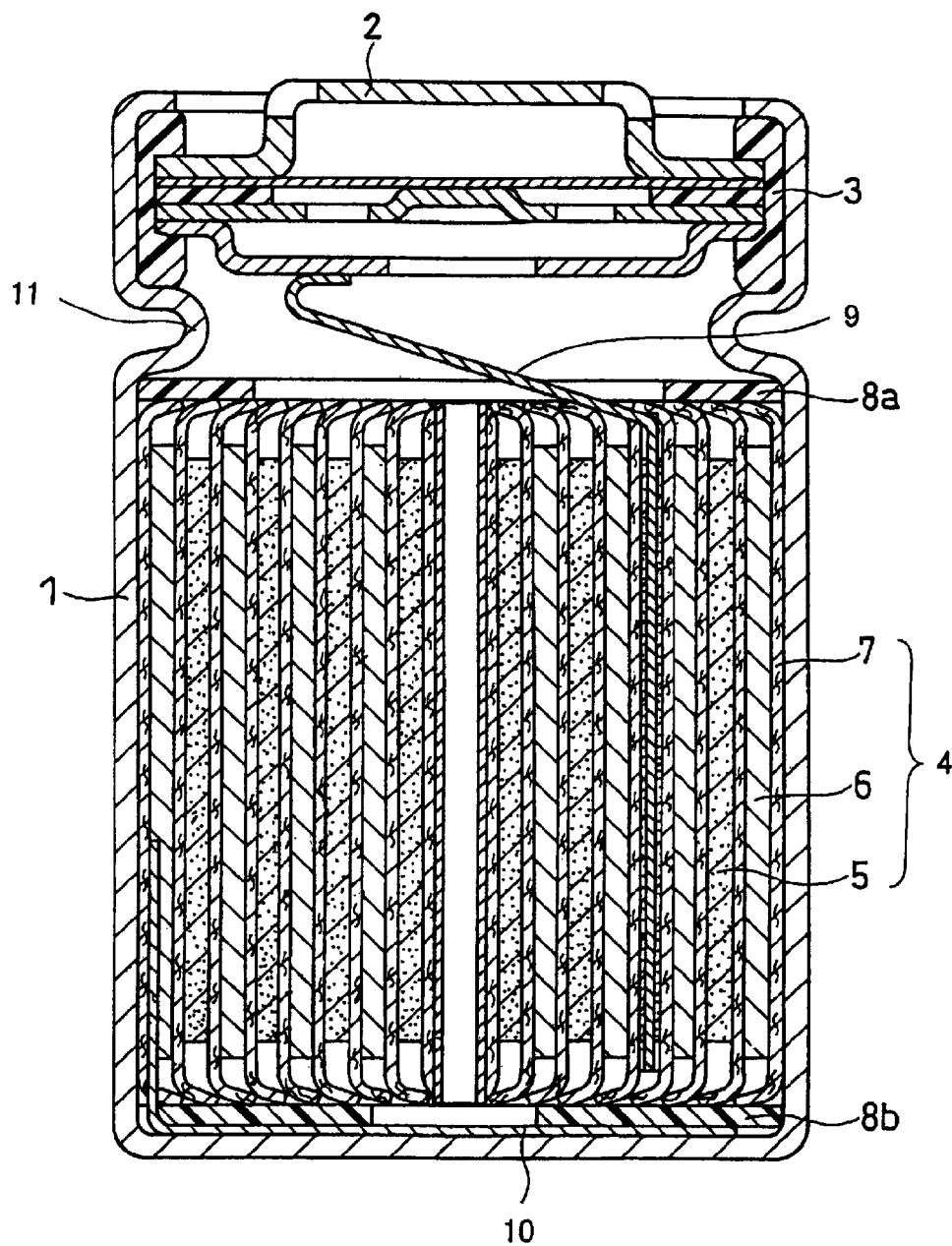
FIG. 1 A longitudinal cross-sectional view of a non-aqueous electrolyte secondary battery according to one embodiment of the present invention FIG. 2a A schematic plane view of a positive electrode used in the non-aqueous electrolyte secondary battery of FIG. 1

A non-aqueous electrolyte secondary battery of the present invention includes an electrode group and a non-aqueous electrolyte. The electrode group includes a positive electrode, a negative electrode, and a separator interposed between the positive electrode and the negative electrode. The positive electrode, the negative electrode, and the separator are wound together. The positive electrode includes a positive electrode current collector, and a positive electrode material mixture layer adhering to a surface of the positive electrode current collector. The negative electrode includes a negative electrode current collector, and a negative electrode material mixture layer adhering to a surface of the negative electrode current collector.

The non-aqueous electrolyte secondary battery has a high capacity, in which the volume energy density is as high as 650 Wh/L or more. Therefore, the active material is densely packed both in the positive electrode and in the negative electrode, and this results in the positive and negative electrode material mixture layers having a low porosity. Specifically, the positive electrode material mixture layer has a porosity $P_p$ of 22% or less, and the negative electrode material mixture layer has a porosity $P_n$ of 25% or less. When the porosities $P_p$ and $P_n$ are within such a range, the difference in permeability of non-aqueous electrolyte between at the positive electrode and at the negative electrode tends to increase, causing a problem of uneven distribution of non-aqueous electrolyte between the electrodes.

The ratio $V_E/V_T$ of a volume $V_E$ of the non-aqueous electrolyte to a total $V_T$ of a pore volume of the positive electrode material mixture layer, a pore volume of the negative electrode material mixture layer, and a pore volume of the separator is 1 or more and 1.5 or less. When the ratio $V_E/V_T$ is less than 1, the non-aqueous electrolyte is difficult to be distributed throughout the electrode group, failing to allow the battery reaction to proceed efficiently. On the other hand, when the non-aqueous electrolyte is used in such a large amount that the ratio $V_E/V_T$ exceeds 1.5, a higher capacity of the battery is difficult to achieve.

Furthermore, in the non-aqueous electrolyte secondary battery of the present invention, the difference $|CA_p-CA_n|$ between a contact angle $CA_p$ of the positive electrode and a contact angle $CA_n$ of the negative electrode with respect to the non-aqueous electrolyte is 23° or less. The contact angle of each of the positive and the negative electrodes with respect to the non-aqueous electrolyte serves as an index to show the permeability of non-aqueous electrolyte into the material mixture layer of each electrode. In the present invention, by controlling the contact angle difference $|CA_p-CA_n|$ between the positive electrode and the negative electrode to 23° or less, uneven distribution of non-aqueous electrolyte between the positive and negative electrodes can be suppressed. As a result, it is possible to effectively suppress a reduction in battery capacity and a reduction in capacity retention rate after repetitive charge and discharge. Here, $|CA_p-CA_n|$ is the absolute value of the difference between the contact angle $CA_p$ and the contact angle $CA_n$, and either one of $CA_p$ and $CA_n$ may be larger than the other, but preferably, $CA_n$ is larger than $CA_p$.

When the contact angle difference between the positive electrode and the negative electrode exceeds 23°, the difference in permeability of non-aqueous electrolyte between at the positive electrode and at the negative electrode increases, and the non-aqueous electrolyte tends to be unevenly distributed between the electrodes, i.e., a larger amount of non-aqueous electrolyte tends to be distributed in the electrode having a smaller contact angle. As a result, the amount of non-aqueous electrolyte becomes insufficient in the electrode having a larger contact angle, and the efficiency of battery reaction is lowered. Consequently, the densely packed active material fails to be effectively utilized, and thus the capacity cannot be extracted to the full. Such problem becomes severer as charge and discharge are repeated, resulting in a low capacity retention rate.

As described above, in the present invention, in a non-aqueous electrolyte secondary battery including a wound electrode group and having a volume energy density of 650 Wh/L or more, the porosities $P_p$ and $P_n$ of the material mixture layers of the positive and negative electrodes, the volume ratio $V_E/V_T$ of the non-aqueous electrolyte to the pore volume in the electrode group, and the difference $|CA_p-CA_n|$ between the contact angles of the positive and negative electrodes with respect to the non-aqueous electrolyte are controlled within the specific ranges as above. Therefore, even if, as a result of achieving a higher capacity, the porosities of the material mixture layers are reduced, and the amount of non-aqueous electrolyte injected is reduced, uneven distribution of non-aqueous electrolyte between the electrodes can be suppressed. Accordingly, the densely packed active material can be effectively utilized, and reductions in battery capacity and in capacity retention rate after charge/discharge cycles can be suppressed, and thus, the cycle life characteristics can be improved.

The volume energy density of the non-aqueous electrolyte secondary battery is preferably 680 Wh/L or more, and more preferably 700 Wh/L or more, or 720 Wh/L or more. In the present invention, even when the battery has such a high volume energy density, the cycle life characteristics can be improved.

The contact angle difference $|CA_p-CA_n|$ is 23° or less, preferably 22° or less, and more preferably 21° or less. The contact angle difference $|CA_p-CA_n|$ may be zero, but is preferably 3 or more, and more preferably 10 or more, or 18 or more. These upper and lower limits may be selected as appropriate and combined. The contact angle difference $|CA_p-CA_n|$ may be, for example, 3 to 23°, or 18 to 21°.

The contact angle $CA_p$ of the positive electrode is, for example, 1 to 20°, and preferably 5 to 18°, or 7 to 16°. The contact angle $CA_n$ of the negative electrode is, for example, 10 to 45°, and preferably 15 to 40°, or 25 to 37°.

The contact angles of the positive and negative electrodes can be measured by a θ/2 method. Specifically, a drop of non-aqueous electrolyte is dispensed onto a surface of each of the positive and negative electrodes in the sheet form before winding, and the contact angle between the drop and the electrode surface is measured after passage of a predetermined time period.

The contact angles of the positive and negative electrodes can be controlled by selecting or adjusting the type of active material, the active material density in the material mixture layer, the porosity, the pressing pressure and the number of times of pressing for forming the material mixture layer, and others.

The porosity $P_p$ of the positive electrode material mixture layer is 22% or less, preferably 21% or less, and more preferably 20% or less, or 19% or less. The porosity $P_p$ is, for example, 10% or more, preferably 13% or more, and more preferably 15% or more. These upper and lower limits may be selected as appropriate and combined. The porosity $P_p$ may be, for example, 10 to 22%, or 15 to 20%. When the porosity $P_p$ is within such a range, the packing density of active material can be easily increased, and in addition, the permeability of non-aqueous electrolyte is unlikely to be reduced more than necessary; and by controlling $CA_p$, the permeability of non-aqueous electrolyte can be less likely to differ between at the positive electrode and at the negative electrode.

The porosity $P_n$ of the negative electrode material mixture layer is 25% or less, preferably 23% or less, and more preferably 22% or less. The porosity $P_n$ is, for example, 15% or more, preferably 17% or more, or 18% or more. These upper and lower limits may be selected as appropriate and combined. The porosity $P_n$ may be, for example, 15 to 25%, or 18 to 22%. When the porosity $P_n$ is within such a range, the packing density of active material can be easily increased, and in addition, the permeability of non-aqueous electrolyte is unlikely to be reduced more than necessary; and by controlling $CA_n$, the permeability of non-aqueous electrolyte can be less likely to differ between at the positive electrode and at the negative electrode. Moreover, when the porosity $P_n$ is within such a range, the charge acceptance at the negative electrode is high, and cracks are unlikely to occur in the active material when pressed.

The difference $|P_p-P_n|$ between the porosity $P_p$ of the positive electrode material mixture layer and the porosity $P_n$ of the negative electrode material mixture layer is, for example, 7% or less, preferably 5.5% or less, and more preferably 5% or less, or 4% or less. The porosity difference $|P_p-P_n|$ is, for example, 2% or more, and preferably 2.2% or more. These upper and lower limits may be selected as appropriate and combined. The porosity difference $|P_p-P_n|$ may be, for example, 2 to 7%, or 2.2 to 5.5%.

When the porosity difference is within such a range, the permeability of non-aqueous electrolyte is unlikely to differ more than necessary between at the positive electrode and at the negative electrode, and uneven distribution of non-aqueous electrolyte between the electrodes can be more effectively suppressed.

Here, $|P_p-P_n|$ is the absolute value of the difference between the porosity $P_p$ and the porosity $P_n$, and either one of $P_p$ and $P_n$ may be higher than the other, but preferably, $P_n$ is higher than $P_p$.

The porosity can be calculated from the true density, thickness and weight of the material mixture layer. The true density of the material mixture layer can be determined by a gas or liquid displacement method.

The porosities of the positive and negative electrodes can be controlled by selecting or adjusting the types and ratios of the constituent components of the material mixture layer, the active material density in the material mixture layer, the pressing pressure and the number of times of pressing for forming the material mixture layer, and others.

The ratio $V_E/V_T$ of the volume $V_E$ of the non-aqueous electrolyte to the total $V_T$ of the pore volumes of the positive electrode material mixture layer, the negative electrode material mixture layer, and the separator is 1 or more, preferably 1.2 or more, and more preferably 1.3 or more. The ratio $V_E/V_T$ is 1.5 or less, and preferably 1.46 or less. These upper and lower limits may be selected as appropriate and combined.

The configuration of the non-aqueous electrolyte secondary battery is more specifically described below, with reference to drawings, as needed.

FIG. 1 is a schematic longitudinal cross-sectional view of a non-aqueous electrolyte secondary battery according to one embodiment of the present invention. The non-aqueous electrolyte secondary battery has an electrode group 4 formed by winding a long belt-shaped positive electrode 5, a long belt-shaped negative electrode 6, and a separator 7 interposed between the positive electrode 5 and the negative electrode 6. In a bottom-closed cylindrical battery case 1 made of metal, the electrode group 4 is housed together with a non-aqueous electrolyte (not shown).

In the electrode group 4, a positive electrode lead 9 is electrically connected to the positive electrode 5, and a negative electrode lead 10 is electrically connected to the negative electrode 6.

The electrode group 4 is housed in the battery case 1 together with a lower insulating ring 8b, with the positive electrode lead 9 being extended outside. The end portion of the positive electrode lead 9 is welded to a sealing plate 2, thereby electrically connecting the positive electrode 5 to the sealing plate 2.

The lower insulating ring 8b is disposed between the bottom surface of the electrode group 4 and the negative electrode lead 10 extended downward from the electrode group 4. The negative electrode lead 10 is welded to the inner bottom surface of the battery case 1, thereby electrically connecting the negative electrode 6 to the battery case 1. An upper insulating ring 8a is placed on the top surface of the electrode group 4.

The electrode group 4 is held within the battery case 1 by the aid of an inwardly protruding step portion 11 formed on the upper side wall of the battery case 1, above the upper insulating ring 8a. On the step portion 11, the sealing plate 2 with a resin gasket 3 disposed around its periphery is placed. The opening end of the battery case 1 is crimped inwardly to seal the battery.

Figure 2A:
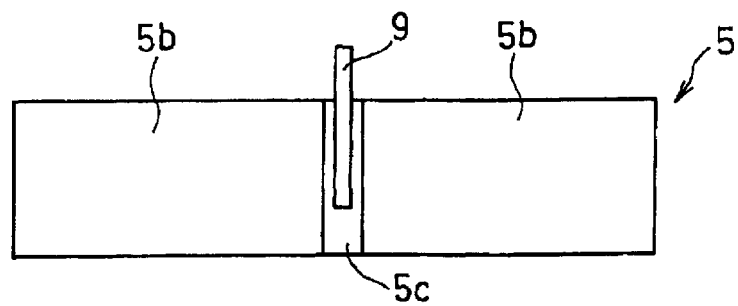
Figure 2B:
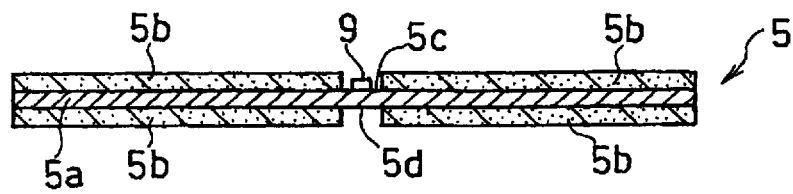
Figure 2C:
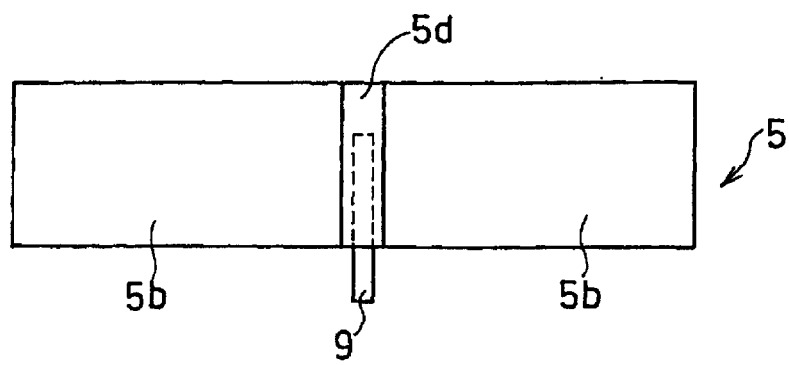
Figure 3A:
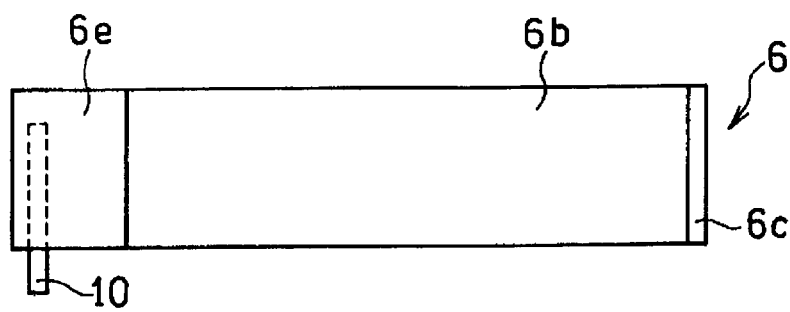
FIG. 3a A schematic plane view of a negative electrode used in the non-aqueous electrolyte secondary battery of FIG. 1
Figure 3B:
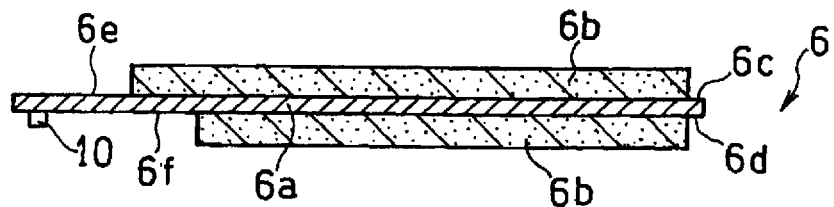
Figure 3C:
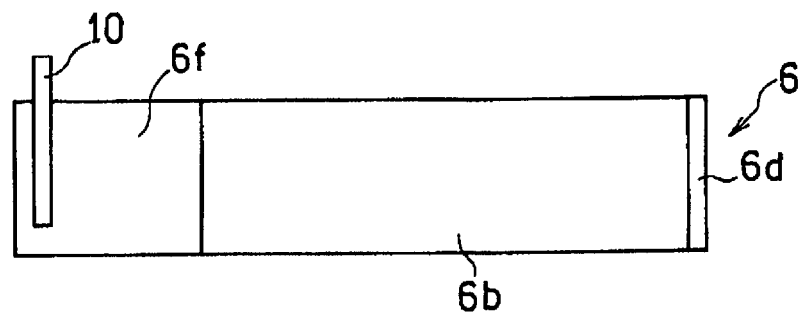

FIGS. 2a, 2b and 2c are a plane view, a cross-sectional view, and a rear view, respectively, schematically illustrating the positive electrode 5 used in the non-aqueous electrolyte secondary battery of FIG. 1. FIGS. 3a, 3b and 3c are a plane view, a cross-sectional view, and a rear view, respectively, schematically illustrating the negative electrode 6 used in the non-aqueous electrolyte secondary battery of FIG. 1.

The positive electrode 5 includes a long belt-shaped positive electrode current collector 5a, and positive electrode material mixture layers 5b formed on both sides of the positive electrode current collector 5a. On both sides of the positive electrode current collector 5a, at the center portion in the longitudinal direction thereof, current collector-exposed portions 5c and 5d having no positive electrode material mixture layer 5b on their surfaces are provided so as to cross the width direction of the positive electrode current collector 5a. One end of the positive electrode lead 9 is welded to the current collector-exposed portion 5c.

The negative electrode 6 includes a long belt-shaped negative electrode current collector 6a, and negative electrode material mixture layers 6b formed on both sides of the negative electrode current collector 6a. At one end of the negative electrode 6 in the longitudinal direction thereof, the same size of current collector-exposed portions 6c and 6d having no negative electrode material mixture layer 6b are formed on both sides of the negative electrode 6. At the other end of the negative electrode 6 in the longitudinal direction thereof, current collector-exposed portions 6e and 6f having no negative electrode material mixture layer 6b are formed on both sides of the negative electrode 6. As for the widths (i.e., the length in the longitudinal direction of the negative electrode 6) of the current collector-exposed portions 6e and 6f, the width of the current collector-exposed portion 6f is larger than that of the current collector-exposed portion 6e. One end of the negative electrode lead 10 is welded to the current collector-exposed portion 6f, at a position near the aforementioned other end of the negative electrode 6 in the longitudinal direction thereof.

Such positioning of the leads allows the non-aqueous electrolyte to be efficiently permeate through the center portions of the positive electrode in the longitudinal direction thereof and through the end portions of the negative electrode in the longitudinal direction thereof.

In the following, each constituent element is more specifically described.

(Positive Electrode)

In the positive electrode of a non-aqueous electrolyte secondary battery, the positive electrode material mixture layer may adhere to both surfaces or to one surface of the positive electrode current collector.

The positive electrode current collector may be a non-porous conductive substrate or a porous conductive substrate having a plurality of through-holes. Examples of the non-porous conductive substrate include metal foil and metal sheet. Examples of the porous conductive substrate include metal foil with communicated-holes (perforated-holes), mesh, net, punched sheet, expanded metal, and lath.

The metal material used for the positive electrode current collector is, for example, stainless steel, titanium, aluminum, or an aluminum alloy.

The thickness of the positive electrode current collector can be selected from the range of, for example, 3 to 50 µm, and is preferably 5 to 30 µm.

The positive electrode material mixture layer includes, for example, a positive electrode active material, a conductive additive, and a binder. In addition to these components, the positive electrode material mixture layer may include a thickener and the like, if necessary.

The positive electrode can be obtained by: applying onto a surface of the positive electrode current collector, a positive electrode slurry including a dispersion medium and constituent components of the positive electrode material mixture layer, such as a positive electrode active material, a conductive additive, and a binder; and pressing the applied film through a pair of rolls, followed by heating, thereby to form a positive electrode material mixture layer. The applied film may be dried before pressing, if necessary.

The positive electrode active material may be any known in the art that can absorb and release lithium ions. The positive electrode active material is preferably one that contains a sufficient amount of lithium, and is, for example, a lithium-containing transition metal oxide. The lithium-containing transition metal oxide preferably has a layered or hexagonal crystal structure, or a spinel structure. The positive electrode active material is usually used in the form of particles.

Examples of the transition metal element include Co, Ni, and Mn. The transition metal element may be partially substituted by another element. The surfaces of the lithium-containing transition metal oxide particles may be coated with another element. Examples of the another element include Na, Mg, Sc, Y, Cu, Zn, Al, Cr, Pb, Sb, and B. One positive electrode active material may be used singly, or two or more positive electrode active materials may be used in combination.

The positive electrode active material is exemplified by lithium cobalt oxide $Li_xCoO_2$, lithium nickel oxide $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, where M is at least one selected from Na, Mg, Sc, Y, Mn, Fe, Co, Ni, Cu, Zn, Al, Cr, Pb, Sb and B. In the above general formulas, $0<x\leq1.2$, $0<y\leq70.9$, and $2.0\leq z\leq2.3$.

The conductive additive (or conductive agent) may be any known in the art, and is, for example, carbon black, such as acetylene black; conductive fibers, such as carbon fibers and metal fibers; and fluorinated carbon. One conductive additive may be used singly, or two or more conductive additives may be used in combination.

The amount of the conductive additive is not particularly limited, and it suffices if it is, for example, 10 parts by volume or less, relative to 100 parts by volume of the active material. In view of increasing the active material density, thereby to achieve a higher battery capacity, as well as of reducing the difference in permeability between at the positive electrode and at the negative electrode, the amount of the conductive additive is preferably 5 parts by volume or less, and more preferably 3 parts by volume or less. The lower limit of the amount of the conductive additive is not particular limited, and may be, for example, 0.01 parts by volume or more, relative to 100 parts by volume of the active material.

The binder may be any known in the art, for example, fluorocarbon resins, such as polytetrafluoroethylene (PTFE), polyvinylidene fluoride (PVDF), and vinylidene fluoride (VDF)-hexafluoropropylene (HFP) copolymer; polyolefin resins, such as polyethylene and polypropylene; polyamide resins, such as aramid; and rubbery materials, such as styrene-butadiene rubber and acrylic rubber. One binder may be used singly, or two or more binders may be used in combination.

It suffices if the amount of the binder is, for example, 10 parts by volume or less, relative to 100 parts by volume of the active material. In view of increasing the active material density, thereby to achieve a higher battery capacity, as well as of reducing the difference in permeability between at the positive electrode and at the negative electrode, the amount of the binder is preferably 5 parts by volume or less, and more preferably 3 parts by volume or less. The lower limit of the amount of the binder is not particular limited, and may be, for example, 0.01 parts by volume or more, relative to 100 parts by volume of the active material.

Examples of the thickener include: cellulose derivatives, such as carboxymethyl cellulose (CMC); $polyC_{2-4}$alkylene glycols, such as polyethylene glycol and ethylene oxide-propylene oxide copolymer; polyvinyl alcohols; and soluble modified rubbers. One thickener may be used singly, or two or more thickeners may be used in combination.

The amount of the thickener is not particularly limited, and is, for example, 0 to 10 parts by volume, and preferably 0.01 to 5 parts by volume, relative to 100 parts by volume of the active material.

Examples of the dispersion medium include, but not limited to, water, alcohols such as ethanol, ethers such as tetrahydrofuran, amides such as dimethylformamide, N-methyl-2-pyrrolidone (NMP), and mixed solvents of these.

In view of controlling the porosity of the positive electrode material mixture layer, the pore volume, the contact angle of the positive electrode with respect to the non-aqueous electrolyte, the active material density in the positive electrode, and others, it is preferable to adjust the pressure and the number of times of pressing. The pressing can be performed by passing a current collector with an applied film formed on a surface thereof, between a pair of rolls. The pressure of pressing may be, as a linear pressure, for example, 5 to 40 kN/cm, and preferably 10 to 35 kN/cm, or 12 to 32 kN/cm. The diameter of the roll can be selected as appropriate from the range of, for example, 500 to 1000 mm. The number of times of pressing can be selected as appropriate according to the pressure of pressing, and may be, for example once to five times, and preferably once to three times.

When the pressure of pressing is raised, or the number of times of pressing is increased, the active material particles may crack, resulting in reduced wettability with non-aqueous electrolyte. Therefore, it is preferable to adjust the permeability of non-aqueous electrolyte, while adjusting the pressure and the number of times of pressing, as appropriate.

The positive electrode material mixture layer can be formed by heating the applied film after pressing. The heating temperature is, for example, 170 to 250° C., and preferably 180 to 220° C.

The thickness of the positive electrode material mixture layer thus formed is, for example, 10 to 60 µm, preferably 12 to 50 µm, and more preferably 15 to 35 µm. When the positive electrode active material is a lithium-containing transition metal oxide, the active material density of the positive electrode material mixture layer is, as an average in the whole positive electrode material mixture layer, for example, 3.3 to 3.9 $g/cm^3$, preferably 3.5 to 3.85 $g/cm^3$, and more preferably 3.6 to 3.8 $g/cm^3$.

(Negative Electrode)

In the negative electrode, the negative electrode material mixture layer may adhere to both surfaces or to one surface of the negative electrode current collector.

The negative electrode current collector may be, like the positive electrode current collector, a non-porous or porous conductive substrate. The thickness of the negative electrode current collector may be selected from the range similar to that of the positive electrode current collector. The metal material used for the negative electrode current collector is, for example, stainless steel, nickel, copper, a copper alloy, aluminum, or an aluminum alloy. Preferred examples among them include copper and a copper alloy.

The negative electrode material mixture layer includes, for example, a negative electrode active material and a binder, and may include, in addition to these components, a conductive additive, a thickener, and the like, if necessary. The negative electrode can be formed in the manner similar to that for forming the positive electrode. Specifically, it can be formed by: applying onto a surface of the negative electrode current collector, a negative electrode slurry including a dispersion medium and constituent components of the negative electrode material mixture layer, such as an active material and a binder; and pressing the formed applied film, followed by heating.

The negative electrode active material may be any known in the art that can absorb and release lithium ions. Examples of the negative electrode active material include various carbonaceous materials, such as graphite (e.g., natural graphite, artificial graphite, and graphitized mesophase carbon), coke, carbon undergoing graphitization, graphitized carbon fibers, and amorphous carbon.

Further examples of the negative electrode active material include: chalcogen compounds that can absorb and release lithium ions at potentials lower than the positive electrode potential, such as transition metal oxides or transition metal sulfides; silicon; silicon-containing compounds, such as silicon oxide $SiO_\alpha$ where $0.05<\alpha<1.95$, and silicide; and lithium alloys and various alloy materials with a composition containing at least one selected from the group consisting of tin, aluminum, zinc, and magnesium.

One negative electrode active material may be used singly, or two or more negative electrode active materials may be used in combination. When a carbonaceous material mainly composed of graphite such as natural graphite or artificial graphite is used as the negative electrode active material, the problem of uneven distribution of non-aqueous electrolyte tends to occur. According to the present invention, even though a carbonaceous material is used as the negative electrode active material for achieving a higher capacity, uneven distribution of non-aqueous electrolyte can be suppressed.

Examples of the binder, dispersion medium, conductive additive, and thickener include those exemplified for the positive electrode. The amount of each component relative to that of the active material can be selected from the ranges similar to those for the positive electrode.

The thickness of the negative electrode material mixture layer can also be selected from the range similar to that for the positive electrode material mixture layer. When the active material is a carbonaceous material such as graphite, the active material density in the negative electrode is, as an average in the whole material mixture layer, for example, 1.3 to 1.9 $g/cm^3$, preferably 1.5 to 1.8 $g/cm^3$, and more preferably 1.6 to 1.8 $g/cm^3$.

(Separator)

The separator is, for example, a resin microporous film, non-woven fabric, or woven fabric. Examples of the resin constituting the separator include: polyolefins, such as polyethylene and polypropylene; polyamide resins, such as polyamide; and polyimide resins, such as polyamide-imide and polyimide. The thickness of the separator is, for example, 5 to 50 μm.

(Non-Aqueous Electrolyte)

The non-aqueous electrolyte contains a non-aqueous solvent, and a lithium salt dissolved in the non-aqueous solvent.

The non-aqueous solvent contains, for example, a cyclic carbonate, a chain carbonate, and/or a cyclic carboxylic acid ester. Examples of the cyclic carbonate include EC and PC. Examples of the chain carbonate include diethyl carbonate, EMC, and DMC. Examples of the cyclic carboxylic acid ester include γ-butyrolactone and γ-valerolactone. One non-aqueous solvent may be used singly, or two or more of non-aqueous solvents may be used in combination.

The non-aqueous solvent preferably contains a cyclic carbonate and a chain carbonate. The cyclic carbonate preferably includes, in particular, EC, and the chain carbonate preferably includes, in particular, EMC and DMC. Since the non-aqueous electrolyte secondary battery of the present invention has a higher capacity, the porosities of the material mixture layers of the positive and negative electrodes are low. A lower porosity of the material mixture layer means a lower permeability of non-aqueous electrolyte thereinto. Therefore, it is preferable to reduce the viscosity of the non-aqueous electrolyte.

The inclusion of DMC in the non-aqueous solvent is advantageous because it can easily reduce the viscosity of the non-aqueous electrolyte. However, because of a high melting point of DMC, the ion conductivity at low temperatures tends to be reduced. By including EMC in the non-aqueous solvent, because of the melting point of EMC as low as −55° C., the non-aqueous electrolyte can have a low melting point (or solidifying point), even when containing a large amount of DMC. DMC has a low dielectric constant and is not highly resistant to oxidation. By including EC in the non-aqueous solvent, the polarity and the resistance to oxidation can be improved. Moreover, the inclusion of EC in the non-aqueous solvent can facilitate the dissociation of lithium salt.

The EC content in the non-aqueous solvent is, for example, 10 to 25 vol %, preferably 18 to 23 vol %, and more preferably 19 to 22 vol %. The EMC content is, for example, 2 to 7 vol %, preferably 3 to 7 vol %, and more preferably 4 to 6 vol %. The DMC content is, for example, 68 to 88 vol %, preferably 70 to 79 vol %, and more preferably 72 to 77 vol %. When the EC, EMC, and DMC contents in the non-aqueous solvent are within the above ranges, it is possible to more effectively reduce the viscosity of the non-aqueous electrolyte, as well as to lower the melting point of the non-aqueous electrolyte, while ensuring a high dielectric constant and excellent resistance to oxidation.

The non-aqueous solvent may further contain a non-aqueous solvent other than EC, EMC and DMC (e.g., the above-exemplified non-aqueous solvent(s) other than EC, EMC and DMC).

Examples of the lithium salt include lithium salts of fluorine-containing acid (e.g., $LiPF_6$, $LiBF_4$, and $LiCF_3SO_3$), and lithium salts of fluorine-containing acid imide (e.g., $LiN(CF_3SO_2)_2$). One lithium salt may be used singly, or two or more of lithium salts may be used in combination.

Among these lithium salts, lithium salts of fluorine-containing acid are preferred, and, in particular, $LiPF_6$ is preferred because it is highly dissociable, and chemically stable in the non-aqueous electrolyte.

The concentration of the lithium salt in the non-aqueous electrolyte is, for example, 0.5 to 2 mol/L, and preferably 1.2 to 1.6 mol/L.

The viscosity at 25° C. of the non-aqueous electrolyte is, for example, 5 mPa·s or less, and preferably 4 mPa·s or less. When the viscosity of the non-aqueous electrolyte is within such a range, the non-aqueous electrolyte can easily permeate into the material mixture layers of the positive and negative electrodes, and uneven distribution of non-aqueous electrolyte between the electrodes can be more effectively suppressed. The viscosity can be measured with a falling ball viscometer, in accordance with JIS Z 8803.

The non-aqueous electrolyte may contain a known additive, such as vinylene carbonate, cyclohexylbenzene, and diphenyl ether, if necessary.

When the battery is, for example, a cylindrical lithium ion secondary battery with a nominal capacity of 3.4 Ah (720 Wh/L), the amount of non-aqueous electrolyte injected into the battery case is preferably 4.3 to 5.5 g, and more preferably 4.4 to 5.3 g. A battery with a higher capacity tends to include a smaller amount of non-aqueous electrolyte. When the amount of non-aqueous electrolyte is smaller, the amount of non-aqueous electrolyte decomposed is also smaller, which means that gas generation is suppressed. In view of this also, the reduction in the capacity retention rate after repetitive charge and discharge can be suppressed.

(Other Constituent Elements)

The electrode group may be of any shape according to the shape of the battery or the battery case, and is, for example, cylindrical, or flat in which the end face perpendicular to the winding axis is elliptic.

The positive and negative electrode leads may be made of metal materials similar to those of the positive and negative electrode current collectors, respectively. Specifically, the positive electrode lead may be made of, for example, an aluminum plate; and the negative electrode lead may be made of, for example, a nickel plate or a copper plate. The negative electrode lead may be a clad lead.

The battery case may be made of metal or laminated film. Examples of the metal material forming the battery case include aluminum, an aluminum alloy (e.g., an alloy containing a small amount of metal such as manganese or copper), and steel sheet. The battery case may be plated with, for example, nickel, if necessary.

The battery case may be of any shape according to the shape of the electrode group, and is, for example, cylindrical or prismatic.

EXAMPLES

In the following, the present invention is specifically described with reference to Examples and Comparative Examples. It is to be noted, however, that the present invention is not limited to the following Examples.

Example 1

A positive electrode 5 and a negative electrode 6 as illustrated in FIGS. 2a to 2c and FIGS. 3a to 3c were produced, and using these electrodes, a cylindrical lithium ion secondary battery illustrated in FIG. 1 was produced, in the following manner.

(1) Production of Positive Electrode

First, 100 parts by volume of lithium nickel oxide serving as a positive electrode active material, 3.6 parts by volume of acetylene black serving as a conductive additive, and 2.5 parts by volume of PVDF serving as a binder were kneaded together with an appropriate amount of NMP, in a kneader, to prepare a positive electrode paste. The obtained positive electrode paste was applied onto both sides of a long belt-shaped aluminum foil (thickness: 15 μm) serving as a positive electrode current collector 5a, and pressed three times in total between a pair of rolls (diameter of each roll: 750 mm) at a linear pressure of 30.4 kN/cm such that the positive electrode active material density of a positive electrode material mixture layer became 3.63 g/ml (porosity: 18.9%), then followed by heating at 195° C. The heated product was cut in the size of 58.2 mm in width and 562.1 mm in length, thereby to produce the positive electrode 5 having positive electrode material mixture layers 5b on both sides of the positive electrode current collector 5a.

On both sides of the positive electrode 5 at the center in the longitudinal direction thereof, current collector-exposed portions 5c and 5d each having a width of 6.5 mm where no positive electrode paste was applied were formed. To the current collector-exposed portion 5c, one end of a 3.5-mm-wide and 0.15-mm-thick positive electrode lead 9 made of aluminum was welded.

(2) Production of Negative Electrode

First, 100 parts by volume of graphite serving as a negative electrode active material and 2.3 parts by volume of styrene-butadiene rubber serving as a binder were kneaded together with an appropriate amount of CMC, in a kneader, to prepare a negative electrode paste. The obtained negative electrode paste was applied onto both sides of a long belt-shaped copper foil (thickness: 10 μm) serving as a negative electrode current collector 6a, and pressed once between a pair of rolls such that the negative electrode active material density became 1.69 g/cc (porosity: 21.7%), then followed by drying. The dry product was cut in the size of 59.2 mm in width and 635.5 mm in length, thereby to produce the negative electrode 6 having negative electrode material mixture layers 6b on both sides of the negative electrode current collector 6a.

At one end of the negative electrode 6 in the longitudinal direction thereof, on both sides thereof, current collector-exposed portions 6c and 6d each having a width of 2.0 mm were formed. At the other end of the negative electrode 6 in the longitudinal direction thereof, on one side thereof, a current collector-exposed portion 6e having a width of 28.0 mm was formed; and on the other side thereof, a current collector-exposed portion 6f having a width of 81.0 mm was formed. To the current collector-exposed portion 6f having a width of 81.0 mm, one end of a 3.0-mm-wide and 0.10-mm-thick negative electrode lead (clad lead) 10 in which Ni/Cu/Ni=25/50/25 was welded.

(3) Production of Battery

The positive and negative electrodes 5 and 6 obtained in (1) and (2) above were wound like a coil, with a microporous separator 7 made of polyethylene interposed therebetween, to form an electrode group 4. The separator 7 had a size of 61.6 mm wide, 650.1 mm long, and 16.5 μm thick.

The electrode group 4 thus obtained was housed in a bottom-closed cylindrical battery case 1 made of metal having an inner diameter of 18.25 mm and a height of 64.97 mm. The other end of the positive electrode lead 9 extended from the electrode group 4 was welded to a sealing plate 2, and the other end of the negative electrode lead 10 was welded to the inner bottom surface of the battery case 1. Subsequently, a step portion 11 protruding inward was formed on the side wall of the battery case 1, above the top end of the electrode group 4, so that the electrode group 4 was held within the battery case 1. Thereafter, 4.50 g of non-aqueous electrolyte was injected into the battery case 1, and the opening of the battery case 1 was crimped onto the peripheral portion of the sealing plate 2, with a gasket 3 interposed therebetween, thereby to seal the battery. A cylindrical lithium ion secondary battery having a nominal capacity of 3.4 Ah (720 Wh/L) was thus produced.

The non-aqueous electrolyte used here was prepared by dissolving $LiPF_6$ at a concentration of 1.40 mol/L, in a mixed solvent prepared by mixing EC, EMC and DMC in a volume ratio of 20:5:75. The viscosity at 25° C. of the non-aqueous electrolyte was measured with a falling ball viscometer, in accordance with JIS Z 8803, and it was 3.1 mPa·s.

Examples 2 to 8 and Comparative Example 1

Positive and negative electrodes were produced in the same manner as in Example 1, except that the linear pressure for pressing and/or the number of times of pressing were adjusted as appropriate such that the positive and negative electrodes each had an active material density (and a porosity) as shown in Table 1. Specifically, the number of times of pressing the positive electrode material mixture layer was three times in Examples 2 to 7 and Comparative Example 1, and once in Example 8. The number of times of pressing the negative electrode material mixture layer was once in all these examples.

Cylindrical lithium ion secondary batteries were produced in the same manner as in Example 1, except that the positive and negative electrodes thus produced were used, and non-aqueous electrolytes having compositions as shown in Table 1 were each used in an amount as shown in Table 1. The viscosity of the non-aqueous electrolyte of Example 4 was measured in the same manner as in Example 1, and it was 2.9 mPa·s.

Note that a difference in the density of the active material leads to a difference in the thickness of the material mixture layer. Therefore, in order to make the tension within the battery equal among these examples, the width and/or length of the positive electrode, the negative electrode, and/or the separator were adjusted as appropriate.

The positive and negative electrodes and the lithium ion secondary batteries obtained in Examples and Comparative Example were subjected to the following evaluations.

(Evaluation of Wettability)

The contact angle at the surface of each of the positive and negative electrodes before winding was measured by a θ/2 method. Specifically, a drop of non-aqueous electrolyte was dispensed onto the surface of each of the positive and negative electrodes in a dry air environment with a dew point of −30° C. or less, and a contact angle (positive electrode: $CA_p$, negative electrode: $CA_n$) between the surface and the drop was measured at 2.1 seconds after drop adhesion.

The non-aqueous electrolyte used here was prepared by dissolving $LiPF_6$ at a concentration of 1.40 mol/L, in a mixed solvent prepared by mixing EC, EMC and DMC in a volume ratio of 15:5:80.

(Evaluation of Discharge Characteristics)

In a 45° C. environment, the lithium ion secondary batteries were constant-current charged at 1595 mA (0.5 hour rate) until the voltage reached 4.2 V, then constant-voltage charged at 4.2 V to an end-of-charge current of 70 mA, and allowed to stand for 10 minutes. Subsequently, they were constant-current discharged at a discharge current of 3190 mA (1 hour rate) and allowed to stand for 10 minutes. The above charge/discharge cycle was repeated 200 cycles in total, and a ratio (capacity retention rate) of the discharge capacity at the 200$^{th}$ cycle to the discharge capacity at the 1$^{st}$ cycle was determined. The obtained capacity retention rate was shown in Table 1 as a cycle retention rate.

The results are shown in Table 1. The followings are also shown in Table 1: the active material densities $D_p$ and $D_n$ of the positive and negative electrodes, the porosities $P_p$ and $P_n$, the porosity difference $|P_p-P_n|$, the contact angles $CA_p$ and $CA_n$, the contact angle difference $|CA_p-CA_n|$, the volume ratio $V_E/V_T$ of the non-aqueous electrolyte, and the composition and weight of the non-aqueous electrolyte.

was higher than that in Example 3. The foregoing indicates that the ratio of non-aqueous electrolyte also has an effect on the suppression of uneven distribution of non-aqueous electrolyte.

In Example 3, as compared with in Example 4, the cycle retention rate was high. This was presumably because the EC content was higher in the battery of Example 3 than in the battery of Example 4, which facilitated a sufficient dissociation of LiPF$_6$ serving as the electrolyte, and thus improved the cycle retention rate.

In Example 6, as compared with in Example 7, the cycle retention rate was high. This was presumably because the weight of non-aqueous electrolyte injected in Example 6 was smaller than that in Example 7, which resulted in a small amount of gas generated, or in less change in electrolyte

TABLE 1

| | Positive electrode | | | Negative electrode | | | | | | Non-aqueous electrolyte | | | | Cycle retention |
|---|---|---|---|---|---|---|---|---|---|---|---|---|---|---|
| | $D_p$ (g/ml) | $P_p$ (%) | $CA_p$ (°) | $D_n$ (g/ml) | $P_n$ (%) | $CA_n$ (°) | $|P_p - P_n|$ (%) | $V_E/V_T$ | $|CA_p - CA_n|$ (°) | EC (%) | EMC (%) | DMC (%) | Weight (g) | rate (%) |
| Ex. 1 | 3.63 | 18.9 | 8.1 | 1.69 | 21.7 | 27.1 | 2.8 | 1.359 | 19.0 | 20 | 5 | 75 | 5.06 | 89 |
| Ex. 2 | 3.79 | 15.3 | 14.3 | 1.76 | 18.5 | 35.3 | 3.2 | 1.452 | 21.0 | 20 | 5 | 75 | 4.50 | 84 |
| Ex. 3 | 3.76 | 16.0 | 14.9 | 1.76 | 18.5 | 35.3 | 2.5 | 1.387 | 20.4 | 20 | 5 | 75 | 4.50 | 82 |
| Ex. 4 | 3.76 | 16.0 | 14.9 | 1.76 | 18.5 | 35.3 | 2.5 | 1.387 | 20.4 | 15 | 5 | 80 | 4.46 | 68 |
| Com. Ex. 1 | 3.71 | 17.1 | 7.5 | 1.76 | 18.5 | 35.3 | 1.4 | 1.374 | 27.8 | 20 | 5 | 75 | 4.50 | 50 or less |
| Ex. 5 | 3.82 | 14.6 | 14.6 | 1.76 | 18.5 | 21.3 | 3.9 | 1.447 | 6.7 | 20 | 5 | 75 | 4.50 | 78 |
| Ex. 6 | 3.82 | 14.6 | 14.6 | 1.73 | 19.9 | 18.3 | 5.3 | 1.387 | 3.7 | 20 | 5 | 75 | 4.50 | 78 |
| Ex. 7 | 3.82 | 14.6 | 14.6 | 1.73 | 19.9 | 18.3 | 5.3 | 1.448 | 3.7 | 20 | 5 | 75 | 4.70 | 73 |
| Ex. 8 | 3.78 | 15.5 | 1.8 | 1.73 | 19.9 | 18.3 | 4.4 | 1.367 | 16.5 | 20 | 5 | 75 | 4.50 | 79 |

As clear from Table 1, in the batteries of Examples in which the contact angle difference $|CA_p-CA_n|$ between the positive electrode and the negative electrode was 23° or less, the cycle retention rates were high.

On the other hand, in the battery of Comparative Example 1 in which the contact angle difference $|CA_p-CA_n|$ exceeded 23°, the cycle retention rate was significantly low. When the contact angle difference between the positive electrode and the negative electrode is too large, the difference in permeability of non-aqueous electrolyte into the material mixture layer tends to increase between at the positive electrode and at the negative electrode. This causes uneven distribution of the electrolyte, which causes the reaction to proceed unevenly. Presumably because of this, the cycle retention rate was low in Comparative Example 1.

In Examples, the capacity retention rates were all high as compared with that in Comparative Example 1. This was presumably because in Examples, the contact angle difference was smaller than that in Comparative Example 1, and as a result, the non-aqueous electrolyte was unlikely to be unevenly distributed between the electrodes.

Particularly in Examples 1 to 3, the cycle retention rates were high, which exceeded 80%. Among Examples 1 to 3, in Example 1, the cycle retention rate was close to 90%. This was presumably because the contact angle difference was comparatively small, which resulted in a smaller difference in permeability of non-aqueous electrolyte between at the positive electrode and at the negative electrode than that in Examples 2 and 3, and as a result, uneven distribution of non-aqueous electrolyte was suppressed. In Example 2, as compared with in Example 3, the porosity difference and the contact angle difference between the positive electrode and the negative electrode were large, but the cycle retention rate was high. In Example 2, the ratio of non-aqueous electrolyte composition association with the decomposition of electrolyte. In Example 8, as compared with in Example 6, the cycle retention rate was high.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

INDUSTRIAL APPLICABILITY

A non-aqueous electrolyte secondary battery of the present invention has a high capacity, and despite this, for example, the cycle capacity retention rate thereof is high. Therefore, the non-aqueous electrolyte secondary battery is useful as, for example, a motor driving power source for hybrid electric vehicles (particularly, for plug-in hybrid vehicles), electric vehicles and the like; a driving power source for various portable electronic devices such as cellular phones, notebook personal computers, and video camcorders; and a large-size power source for home storage power devices.

REFERENCE SIGNS LIST

1 Battery case
2 Sealing plate
3 Gasket
4 Electrode group

5 Positive electrode
5a Positive electrode current collector
5b Positive electrode material mixture layer
5c, 5d Positive electrode current collector exposed portion
6 Negative electrode
6a Negative electrode current collector
6b Negative electrode material mixture layer
6c, 6d, 6e, 6f Negative electrode current collector exposed portion
7 Separator
8a Upper insulating ring
8b Lower insulating ring
9 Positive electrode lead
10 Negative electrode lead
11 Step portion

The invention claimed is:

1. A non-aqueous electrolyte secondary battery comprising: an electrode group including a positive electrode, a negative electrode, and a separator interposed between the positive electrode and the negative electrode, the positive electrode, the negative electrode, and the separator being wound together; and a non-aqueous electrolyte, and having a volume energy density of 650 Wh/L or more, the positive electrode including a positive electrode current collector, and a positive electrode material mixture layer adhering to a surface of the positive electrode current collector;

the negative electrode including a negative electrode current collector, and a negative electrode material mixture layer adhering to a surface of the negative electrode current collector;

the positive electrode material mixture layer having a porosity $P_p$ of 22% or less, and the negative electrode material mixture layer having a porosity $P_n$ of 25% or less;

a ratio $V_E/V_T$ of a volume $V_E$ of the non-aqueous electrolyte to a total $V_T$ of a pore volume of the positive electrode material mixture layer, a pore volume of the negative electrode material mixture layer, and a pore volume of the separator being 1 or more and 1.5 or less; and a difference between a contact angle $CA_p$ of the positive electrode and a contact angle $CA_n$ of the negative electrode with respect to the non-aqueous electrolyte being 23° or less.

2. The non-aqueous electrolyte secondary battery according to claim 1, wherein the difference between the contact angle $CA_p$ of the positive electrode and the contact angle $CA_n$ of the negative electrode is 21° or less.

3. The non-aqueous electrolyte secondary battery according to claim 1, wherein:

the non-aqueous electrolyte includes a non-aqueous solvent, and a lithium salt dissolved in the non-aqueous solvent;

the non-aqueous solvent includes ethylene carbonate, ethyl methyl carbonate, and dimethyl carbonate; and in the non-aqueous solvent, a content of the ethylene carbonate is 10 to 25 vol %, a content of the ethyl methyl carbonate is 2 to 7 vol %, and a content of the dimethyl carbonate is 68 to 88 vol %.

4. The non-aqueous electrolyte secondary battery according to claim 3, wherein in the non-aqueous solvent, the content of the ethylene carbonate is 18 to 23 vol %, the content of the ethyl methyl carbonate is 3 to 7 vol %, and the content of the dimethyl carbonate is 70 to 79 vol %.

5. The non-aqueous electrolyte secondary battery according to claim 1, wherein a difference between the porosity $P_p$ of the positive electrode material mixture layer and the porosity $P_n$ of the negative electrode material mixture layer is 7% or less.

6. The non-aqueous electrolyte secondary battery according to claim 1, wherein the difference between the porosity $P_p$ of the positive electrode material mixture layer and the porosity $P_n$ of the negative electrode material mixture layer is 2.2 to 5.5%.

7. The non-aqueous electrolyte secondary battery according to claim 1, wherein a viscosity at 25° C. of the non-aqueous electrolyte is 5 mPa·s or less.

8. The non-aqueous electrolyte secondary battery according to claim 1, wherein:

the positive electrode material mixture layer having a porosity $P_p$ of 19% or less, and the negative electrode material mixture layer having a porosity $P_n$ of 22% or less.

9. The non-aqueous electrolyte secondary battery according to claim 1, wherein the difference between the contact angle $CA_p$ of the positive electrode and the contact angle $CA_n$ of the negative electrode is 3° or more and 23° or less.

10. The non-aqueous electrolyte secondary battery according to claim 1, wherein the difference between the contact angle $CA_p$ of the positive electrode and the contact angle $CA_n$ of the negative electrode is 18° or more and 23° or less.

11. The non-aqueous electrolyte secondary battery according to claim 1, wherein the contact angle $CA_p$ of the positive electrode is 1 to 20°.

12. The non-aqueous electrolyte secondary battery according to claim 1, wherein the contact angle $CA_n$ of the negative electrode is 10 to 45°.

13. The non-aqueous electrolyte secondary battery according to claim 1, wherein the contact angle $CA_p$ of the positive electrode is smaller than the contact angle $CA_n$ of the negative electrode.

* * * * *